United States Patent [19]
Bouillot et al.

[11] Patent Number: 4,902,130
[45] Date of Patent: Feb. 20, 1990

[54] LASER RAY PROJECTOR AND REMOTE MEASURING DEVICE COMPRISING AT LEAST TWO OF THESE PROJECTORS

[76] Inventors: Lucien Bouillot, 26 Rue du Pré d'Elle, Meylan, France, 38240; Bernard Barthelemy, 50 la Chanteraie, Claix, France, 38640

[21] Appl. No.: 205,840
[22] Filed: Jun. 13, 1988
[30] Foreign Application Priority Data Jul. 24, 1987 [FR] France ............................. 87 10715

[51] Int. Cl.$^4$ ............................................. G01C 9/02
[52] U.S. Cl. ........................................ 356/248; 356/1; 356/3; 356/138; 350/6.4
[58] Field of Search .................. 356/1, 3, 138, 147, 356/150, 153, 247, 248; 350/6.1, 6.2, 6.4, 6.5, 6.7, 6.8

[56] References Cited
U.S. PATENT DOCUMENTS 4,118,109 10/1978 Crawford et al. ................... 350/6.4
4,616,226 10/1986 Morley ............................... 356/248

FOREIGN PATENT DOCUMENTS 2518254 6/1983 France ................................ 356/1

Primary Examiner—Davis L. Willis
Assistant Examiner—S. A. Turner
Attorney, Agent, or Firm—Dowell & Dowell

[57] ABSTRACT

A laser ray projector and remote measuring device comprising at least two of these projectors, wherein the measuring device comprises two laser ray projectors servo-controlled in position. Each of them comprises a spindle rotating through 180° in one direction and in another from a certain point and a head secured to this spindle and rotating through 90° in one direction and in the other from an origin. This head carries a prism which receives in each projector a laser ray issuing from a single source whereby rotation of the spindle and of the head enables each ray to scan all the points of a hemisphere. A computer makes it possible to convert the angular coordinates into cartesian coordinates.

11 Claims, 2 Drawing Sheets

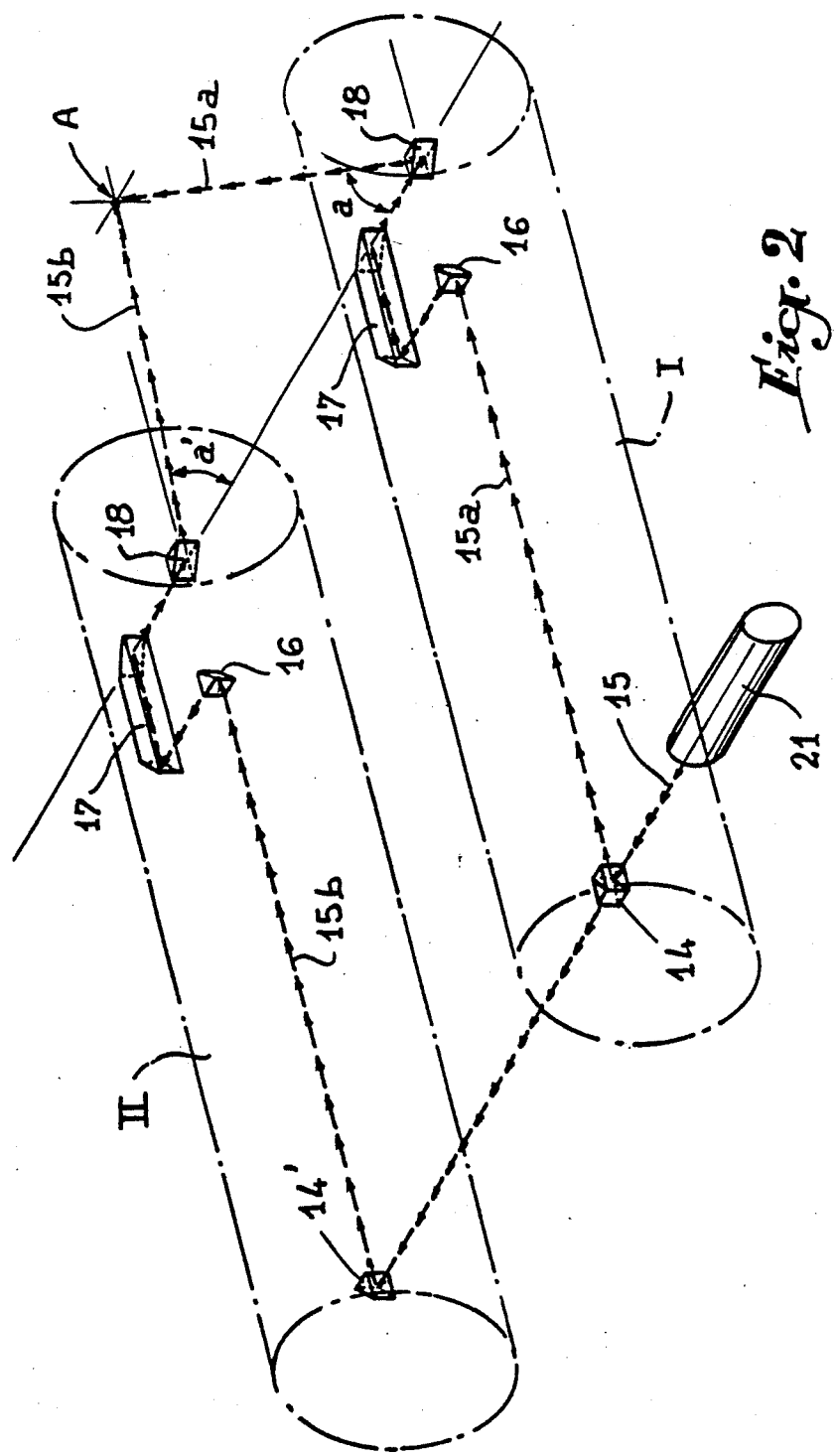

LASER RAY PROJECTOR AND REMOTE MEASURING DEVICE COMPRISING AT LEAST TWO OF THESE PROJECTORS

BACKGROUND OF THE INVENTION

1. Field of the Invention

The present invention relates to a laser ray projector and to a remote measuring device comprising at least two of these projectors.

2. History of the Related Art

Devices are known for precisely measuring the position of a point with respect to its environment or the successive positions of this point if it is mobile. The devices in question comprise, for example, two theodolites and a micro-computer in which the coordinates noted by the theodolites are entered in order to convert the polar coordinates into cartesian coordinates.

However, electronic theodolites are difficult to aim at a point with accuracy, being given that aiming is effected in optical manner, with all the hazards that this involves.

3. Summary of the Invention

The improvements forming the subject matter of the present invention aim at producing a laser ray projector which, in association with another, makes it possible to determine the coordinates of one or more points in space, remotely and without physical contact therewith in order to determine the dimensions or shape of an object. The laser rays making it possible, thanks to their "spot", to be exactly aimed at the desired places. In this way, the device according to the invention is much more practical to use than the known measuring apparatus, since the point of impact of each of the rays intended for marking the point or points of which the coordinates are desired, is materialized.

To that end, two projectors are used, each comprising a casing, a spindle mounted to rotate in the casing so as to be able to move angularly step-by-step through at least 360°. The spindle is secured with a head mounted to rotate about a geometrical axis at right angles to the axis of rotation of the spindle. Optical means are provided for bringing the laser ray into the geometrical axis of the head after it has traversed the spindle along a path merged with the axis and a prism is provided which is secured to the head and is adapted to reflect the laser ray in a mobile plane containing the geometrical axis of the spindle.

The optical means comprise a first separator prism and an assembly of prisms mounted on the spindle in order to bring the ray into the centre of the head which is animated by a movement of rotation through 180°, viz. 90° in one direction and 90° in the other, from a determined origin.

The remote measuring device according to the invention comprises a single laser ray emitter supplying the two projectors at the same time, as well as means for transmitting angular values of the points of encounter of the two laser rays to a computer which furnishes the cartesian data of the points or vice versa.

BRIEF DESCRIPTION OF THE DRAWINGS

The invention will be more readily understood on reading the following description with reference to the accompanying drawings, in which:

FIG. 2 schematically shows the constitution of a remote measuring device comprising two projectors such as the one illustrated in FIG. 1.

DESCRIPTION OF THE PREFERRED EMBODIMENT

Figure 1:
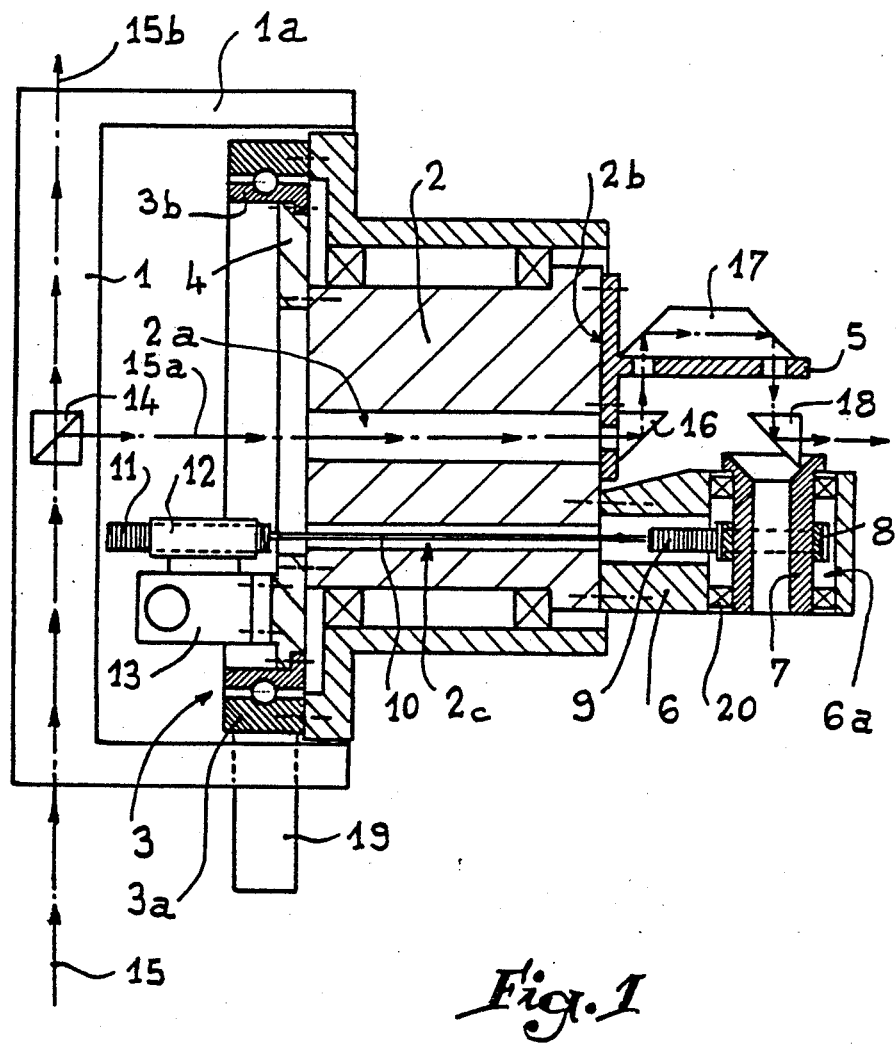
FIG. 1 is a transverse section through a projector according to the invention.

Referring now to the drawings, the projector illustrated in FIG. 1 essentially comprises a fixed casing 1 in which an "azimuth" spindle 2 rotates. Rotation of the spindle is ensured by a high-precision roller bearing 3 of which the outer cage 3a is fixed to a tubular sleeve 1a extending from the casing 1, while its inner ring 3b is fastened to the spindle 2 via a flange 4. The spindle 2 comprises a central bore 2a whose role will be explained more clearly hereinbelow. The outer end 2b of the spindle 2 carries a support 5 of which the active part is perpendicular to the face, i.e. it is parallel to the geometrical axis of the bore 2a.

Face 2b of the spindle 2 also carries a bearing 6 provided with a bore 6a oriented perpendicularly to the support 5 and in which a head 7 is rotatably mounted. The latter is surrounded by a pinion 8 which meshes with a rack 9 associated with the end of a rod 10, traversing the spindle 2 in a longitudinal hole 2c and whose opposite end is associated with another rack 11 meshing with a pinion 12 driven in rotation by a motor assembly 13 secured to the flange 4 and consequently rotating with the spindle 2. The precision of assembly 13 is such that it enables increments of the order of a thousandth of degree to be obtained.

It will be observed that the casing 1 supports a separator prism 14 adapted to send part 15a of a laser ray 15 along the geometrical axis of the bore 2a so that it penetrates into a prism 16 sending this ray at right angles with respect to the geometrical axis of the spindle 2 so that it arrives on a prism 17 carried by the support 5 and which is organized so that the laser ray 15a is sent into the geometrical axis of the head 7 in order to cooperate with a prism 18 carried by the head and which reflects the ray 15a in a mobile plane containing the geometrical axis of the spindle 2.

The ring 3b of bearing 3 is associated with a step-by-step motor 19 ensuring a rotation through 180° in one direction and in another of the spindle 2 from a point determined with an angular precision of 1 thousandth of a degree.

As for the motor assembly 13, it allows rotation of pinion 12 in one direction and in the other so that, thanks to racks 11 and 9, the head 7 can pivot about its geometrical axis through 90° in one direction and through 90° in the other, from a determined origin.

Finally, it will be noted that high-precision roller bearings 20 ensure rotation of the head 7 with respect to the support 6.

In the example illustrated in FIG. 2, two cylinders I and II schematically represent two projectors such as the one illustrated in FIG. 1. This Figure shows the source 21 emitting the laser ray 15 and the prisms of the heads. It will be noted that the inlet prism of the head 11 has been referenced 14', and is not a separator prism, but a simple deflecting prism. The other prisms of this head referenced 16, 17 and 18 are strictly similar to those bearing the same references in projector I. Reference 15b designates the laser ray penetrating in projector II.

Functioning follows from the foregoing explanations.

The laser ray 15 issuing from source 21 firstly passes through the separator prism 14 which enables this ray to be sent on the one hand perpendicularly to its general direction to form a first ray 15a merged with the geometrical axis of bore 2a, and to traverse this prism and reach prism 14' which deflects it in a second ray 15b penetrating in projector II. In this way, the two projectors each emit an orientable laser ray. In fact, the combination of the rotations of the spindle 2 of each projector I and II and of the head 7 allows scanning of the whole of a hemisphere by the ray of each of the projectors.

It will be noted that the two projectors I and II are servo-controlled in position and located in the same plane and at a known distance from each other. The ray of each projector is aimed on point A of which the coordinates are desired. Knowing the angular values a, a' indicated by each of the projectors, the cartesian coordinates of the point in question are obtained by trigonometric calculation. Such calculation may be effected by means of a calculator such as a computer allowing automatic calculation as well as three-dimensional cartography of the whole of the measurements on screen or on graphic plotter. Similarly, from prior surveys, a checking in time is also possible.

The two projectors I and II are controlled in accordance with the following two hypotheses:

Each of the laser rays 15a, 15b leaving the two apparatus I and II may be aimed at sight on a point A or a given object with the aid of control levers (not shown) acting on the two motor assemblies 13 and 19. When the aim is considered correct, the order is given to the computer to calculate the coordinates of the points aimed at.

On the contrary, the known coordinates of point A or of the object to be aimed at are entered in the computer which firstly calculates the angular values and then controls aiming of each laser ray on the point corresponding to the coordinates selected.

An apparatus is thus produced capable of effecting measurements remotely and without physical contact with the objects, and of effecting three-dimensional controls in normal medium or in unknown medium. In particular, the apparatus according to the invention makes it possible to effect measurements of pieces disposed in an enclosure subjected to the radiations of a nuclear fuel. The protection system may be an envelope constituted by a very thin sheet of "milard", a composite material highly permeable to the laser rays but which does not deflect the beam when the latter presents an angle of incidence with respect to said envelope.

The computer of the device according to the invention allows simple use and immediate knowledge of the results of the controls which are highly precise, i.e. about 2 millimeters at 10 meters distance (2/10000).

The establishment of a simultaneous cartography makes it possible to know the shape and dimensions of the objects monitored, as well as a comparison of the results or cartographies between two monitoring campaigns thus allowing the development in time of the shapes in question to be followed.

It must, moreover, be understood that the foregoing description has been given only by way of example and that it in no way limits the domain of the invention which would not be exceeded by replacing the details of execution described by any other equivalents.

What is claimed is:

1. A laser ray projector for selectively projecting a laser ray from a source comprising a fixed casing, a spindle mounted within said casing so as to be rotatably moved with respect thereto about a first geometrical axis, said spindle having inner and outer portions, a head mounted to said outer portion of said spindle, means for rotating said head about a second geometrical axis generally perpendicular to said first geometrical axis, a bore through said spindle and oriented along said first geometrical axis, optical means for directing the laser ray from the source through said bore and thereafter into said second geometrical axis of said head, and a prism carried by said head for reflecting the laser ray from said optical means in a moveable plane containing said first geometrical axis of said spindle.

2. The laser ray projector of claim 1 wherein the optical means includes a first receiving prism for directing the laser ray from the source through said bore of said spindle, a first reflecting prism means for directing the laser ray perpendicularly of said first geometrical axis after the laser ray has passed through said bore, second reflecting prism means for redirecting the laser ray toward said prism means carried by said head.

3. The laser ray projector of claim 2 wherein said head is rotatable through 180°, 90° in one direction and 90° in another from a point of origin.

4. The laser ray projector of claim 3 wherein said means for rotating said head about said second geometrical axis includes a step-by-step motor assembly supported by said spindle, said motor assembly rotating a pinion meshing with a first rack secured to a second rack which meshes with a toothed ring placed around said head so that said head rotates when the motor assembly is activated.

5. The laser ray projector of claim 1 wherein said head is rotatable through 180°, 90° in one direction and 90° in the other from a point of origin.

6. The laser ray projector of claim 5 wherein said spindle supports a step-by-step motor assembly, said motor assembly rotating a pin which meshes with a first rack secured to a second rack which meshes with a tooth gear placed around said head so that said head rotates when the motor assembly is activated.

7. The laser ray projector of claim 1 wherein said spindle supports a motor assembly, a toothed ring placed around said head, and rack and pinion means for interconnecting said motor with said toothed ring so that said head rotates when the motor assembly is activated.

8. A remote measuring device comprising a pair of laser ray projectors, each of said laser ray projectors including a fixed casing, a spindle mounted within each of said casings so as to be rotatably moved with respect thereto about first geometrical axes, said spindles having inner and outer portions, a head mounted to said outer portion of each of said spindles, means for rotating each of said heads about second geometrical axes which are generally perpendicular to said first geometrical axes, a bore through each of said spindles and oriented along said first geometrical axes, each of said laser ray projectors including optical means for directing a laser ray through said bores and thereafter into said second geometrical axes of said head, a prism carried by each of said heads for reflecting the laser ray in a moveable plane containing said first geometrical axes of each of said spindles, and a laser ray emitter for directing the laser ray to said optical means of each of said laser ray projectors whereby each of said laser ray projectors may be aimed on a point whose coordinates it is desired to obtain.

9. The remote measuring device of claim 8 in which each of said optical means of said laser ray projectors includes a first receiving prism for directing the laser ray through said bore of said spindle, a first reflecting prism means for directing the laser ray perpendicularly to said first geometical axis after the laser ray has passed through said bore of said laser ray projector, and second reflecting prism means for redirecting the laser ray toward said prism means carried by said head of said laser ray projector.

10. The remote measuring device of claim 9 wherein said laser ray emitter projects the laser ray to said first receiving prism of a first of said laser ray projectors, said first receiving prism of said first laser ray projector separating said laser ray so that a portion of said laser ray passes to said first receiving prism of the other of said laser ray projectors.

11. The remote measuring device of claim 10 including means for transmitting the angular values of each of said laser ray projectors when said projectors are positioned so that the laser ray emitted therefrom along said first geometrical axes from said heads are focused on a common point, and computer means for determining the coordinates of the common point of focus.

* * * * *